S. BOOTH.
Apparatus for Pressing Meat Scraps.
No. 148,870. Patented March 24, 1874.
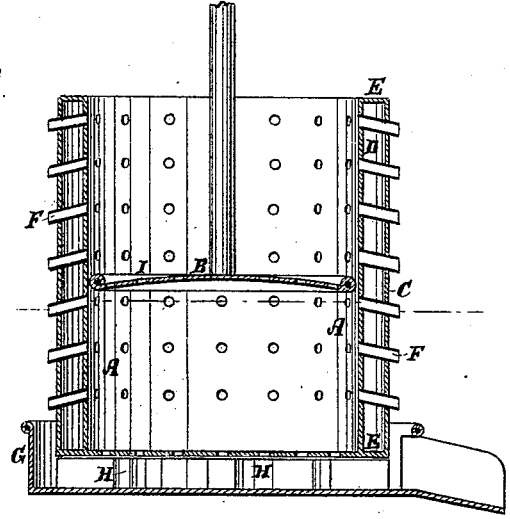
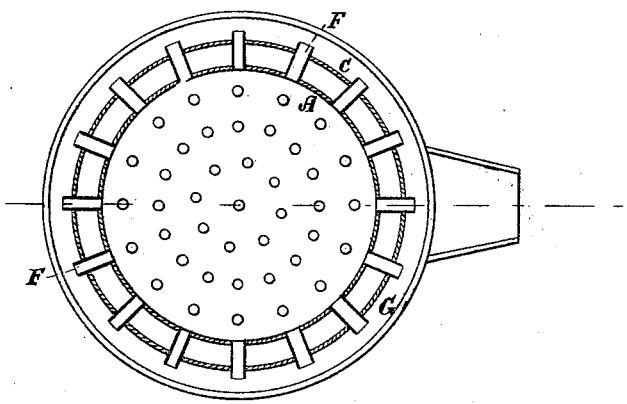
WITNESSES.
INVENTOR.
S. Booth
BY
ATTORNEYS.

UNITED STATES PATENT OFFICE.

SAMUEL BOOTH, OF NEW YORK, N. Y.

IMPROVEMENT IN APPARATUS FOR PRESSING MEAT SCRAPS.

Specification forming part of Letters Patent No. 148,870, dated March 24, 1874; application filed February 28, 1874.

*To all whom it may concern:*

Be it known that I, SAMUEL BOOTH, of the city, county, and State of New York, have invented a new and Improved Apparatus for Pressing Meat Scraps, of which the following is a specification:

My invention consists of a tub for the pressing of meat scraps, having a surrounding jacket inclosing the tub in a space for heating it by steam, with pipes running through it from the orifices for the escape of the fat, and projecting a little beyond the outside of the jacket for discharging the fat into the receiving-pan below. The press-follower is provided with holes for the escape of some of the fat through it directly from the surface of the scraps, whereon the follower acts. The object of the jacket is to maintain the scraps at the proper degree of heat for obtaining the best results throughout the process of pressing, and thus save considerable loss now sustained, both in the quantity of fat obtained and time consumed, in consequence of the cooling of the scraps after being put into the press.

Figure 1 is a sectional elevation of my improved scrap-press, taken on the line $x \, x$ of Fig. 2. Fig. 2 is a horizontal section taken on the line $y \, y$ of Fig. 1.

Similar letters of reference indicate corresponding parts.

A is the ordinary pressing tub or case for pressing meat scraps to obtain the fat, said tub having holes through the sides and the bottom for the fat to escape as the pressure is applied by a follower, B. C is a metal steam-jacket, with which I surround the tub, making a steam-space, D, and closing it steam-tight, at E, top and bottom. F represents short pipes, extending from the holes in the sides of the tub through the steam space and jacket, and projecting a little beyond to discharge the fat into the pan G, above which the tub rests, on blocks H, to allow the fat to escape through the bottom also. A steam-pipe will connect the space D with the boiler or escape-pipe of an engine to admit the steam for heating the contents of the tub. I represents the holes in the follower for the escape of fat through it. Hot air may, of course, be used as a substitute for the steam for heating the scraps, if preferred.

Having thus described my invention, I claim as new and desire to secure by Letters Patent—

The press-tub A of a meat-scrap press, having a surrounding steam-jacket, C, for heating it, and also having escape-pipes F for the fat passing out through the jacket, in the manner described.

SAML. BOOTH.

Witnesses:
T. B. MOSHER,
ALEX. F. ROBERTS.